US 6,527,224 B2

(12) United States Patent
Seidel

(10) Patent No.: US 6,527,224 B2
(45) Date of Patent: Mar. 4, 2003

(54) SEPARATE BOUNDARY LAYER ENGINE INLET

(75) Inventor: Gerhard E. Seidel, Renton, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/816,985

(22) Filed: Mar. 23, 2001

(65) Prior Publication Data

US 2002/0134886 A1 Sep. 26, 2002

(51) Int. Cl.⁷ ............................................... B64D 27/00
(52) U.S. Cl. .................. 244/53 B; 244/53 A; 244/53 R
(58) Field of Search ............................ 244/53 B, 53 A, 244/53 R

(56) References Cited

U.S. PATENT DOCUMENTS

| 3,237,891 A | * | 3/1966 | Wotton ........................ 244/55 |
| 3,489,377 A | | 1/1970 | Pearson et al. .......... 219/85.15 |
| 3,583,661 A | | 6/1971 | Stake ........................ 244/53 B |
| 4,176,812 A | | 12/1979 | Baker ....................... 244/129.5 |
| 4,198,018 A | | 4/1980 | Brault ........................ 244/119 |
| 4,455,045 A | | 6/1984 | Wheeler ..................... 296/185 |
| 4,456,204 A | * | 6/1984 | Hapke ...................... 244/53 R |
| 4,463,772 A | | 8/1984 | Ball ........................... 137/15.2 |
| 5,031,859 A | | 7/1991 | Cunningham ............... 244/12.1 |
| 5,114,097 A | * | 5/1992 | Williams ................. 244/117 R |
| 5,299,760 A | * | 4/1994 | Finch et al. ............... 244/53 B |
| 5,779,189 A | | 7/1998 | Hamstra et al. ........... 244/53 B |
| 5,848,193 A | | 12/1998 | Garcia ......................... 382/232 |
| 5,893,535 A | * | 4/1999 | Hawley ....................... 244/119 |
| 5,909,858 A | | 6/1999 | Hawley ......................... 244/36 |
| 6,089,504 A | * | 7/2000 | Williams et al. .............. 244/15 |

OTHER PUBLICATIONS

"Single Turbo Fan Reliablity", Apr. 2000, vol. 1, Issue 1, pp. 1–3.*

* cited by examiner

Primary Examiner—Charles T. Jordan
Assistant Examiner—Stephen A Holzen
(74) Attorney, Agent, or Firm—Harness Dickey & Pierce P.L.C.

(57) ABSTRACT

A dual boundary layer engine inlet for a turbofan propulsion engine of an aircraft having a first air inlet positioned generally within the boundary layer flowing around the exterior surface of the aircraft. A first passageway fluidly interconnects the first air inlet and the turbofan propulsion engine to provide air from the boundary layer to the bypass to reduce aerodynamic drag. A second air inlet is positioned generally outside of the boundary layer. This second passageway fluidly interconnecting the second air inlet and the turbofan propulsion engine to provide air outside of the boundary layer to the core and compressor of the turbofan engine to maintain engine efficiency.

17 Claims, 2 Drawing Sheets

SEPARATE BOUNDARY LAYER ENGINE INLET

FIELD OF THE INVENTION

The present invention generally relates to an engine inlet system for a turbofan propulsion engine and, more particularly, to an engine inlet system that is capable of separately diverting boundary layer air and free-stream air into a turbofan propulsion engine

BACKGROUND OF THE INVENTION

In conventional aircraft design, the wings of the aircraft provide aerodynamic lift and further support the weight of the fuselage. Engines are then coupled to the wings and/or the fuselage to provide thrust for propelling the aircraft.

However, recently there have been significant developments into the design of "blended wing-body" aircraft. In a blended wing-body aircraft, the fuselage and wings are joined to form a smooth curve along the exterior of the aircraft with no discrete interface between the fuselage and the wing. In order to maintain the aerodynamic efficiency and lift characteristics of a blended wing-body aircraft, it has been determined that an aft-mounted engine configuration provides the least disturbance of airflow over the wing-body surface, thereby maintaining the aerodynamic efficiencies and advantages of the blended wing-body design.

Aerodynamic lift is the result of the movement of fluid (e.g. air) over the surface of the wing. According to the laws of fluid dynamics, such fluid movement produces a boundary layer between a region of low static pressure and a region of high static pressure. According to current wing design technology, it is preferable to keep this boundary layer attached along a wing surface in order to delay or totally prevent flow separation. Such delay or prevention of the flow separation improves the aerodynamic characteristics of the wing surface, thereby providing a wing that produces less drag relative to a wing having a separated flow field.

During flight, the boundary layer air that typically forms along the wing surfaces and fuselage is of low velocity and low static pressure. Because low energy air causes poor engine performance, some aircraft have employed some type of boundary layer diverter system to prevent the boundary layer air from entering the engine inlet.

Present boundary layer diverters require various subsystems or add on baffles to make them work properly. Such subsystems and/or baffles may increase the weight, the cost of production, mechanical complexity, and the cost of maintenance of the aircraft. Also, the engines would be mounted higher up, causing nose-down moments and increased wetted area.

On the other hand, in the case of a blended wing-body aircraft, when the engines are mounted generally flush with a trailing edge of the effective wing, the mixture of boundary layer air and free stream air causes distortion in a combined inlet. That is, simply aft mounting engines to a blended wing-body aircraft may produce poor aerodynamic efficiency of the effective wing surface and may cause poor engine efficiency due to the intake of low energy boundary layer air.

Accordingly, there exists a need in the relevant art to provide an engine inlet system for a turbofan propulsion engine that is capable of separately diverting boundary layer air and free-stream air to a turbojet propulsion engine. Furthermore, there exists a need in the relevant art to provide an engine inlet system that is capable of maximizing the aerodynamic efficiency of the wing surface and, simultaneously, maximizing the engine efficiency of the jet propulsion engine. Still further, there exists a need in the relevant art to provide an engine inlet system that overcomes the disadvantages of the prior art.

SUMMARY OF THE INVENTION

A dual boundary layer engine inlet for a turbofan propulsion engine of an aircraft having an advantageous construction is provided. The engine inlet includes a first air inlet positioned generally within the boundary layer flowing around the exterior surface of the aircraft. A first passageway fluidly interconnects the first air inlet and the jet propulsion engine to provide air from the boundary layer to the bypass to reduce aerodynamic drag. A second air inlet is positioned generally outside of the boundary layer. This second passageway fluidly interconnecting the second air inlet and the turbofan propulsion engine to provide free-stream air outside of the boundary layer to the core and compressor of the turbofan engine to maintain engine efficiency.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
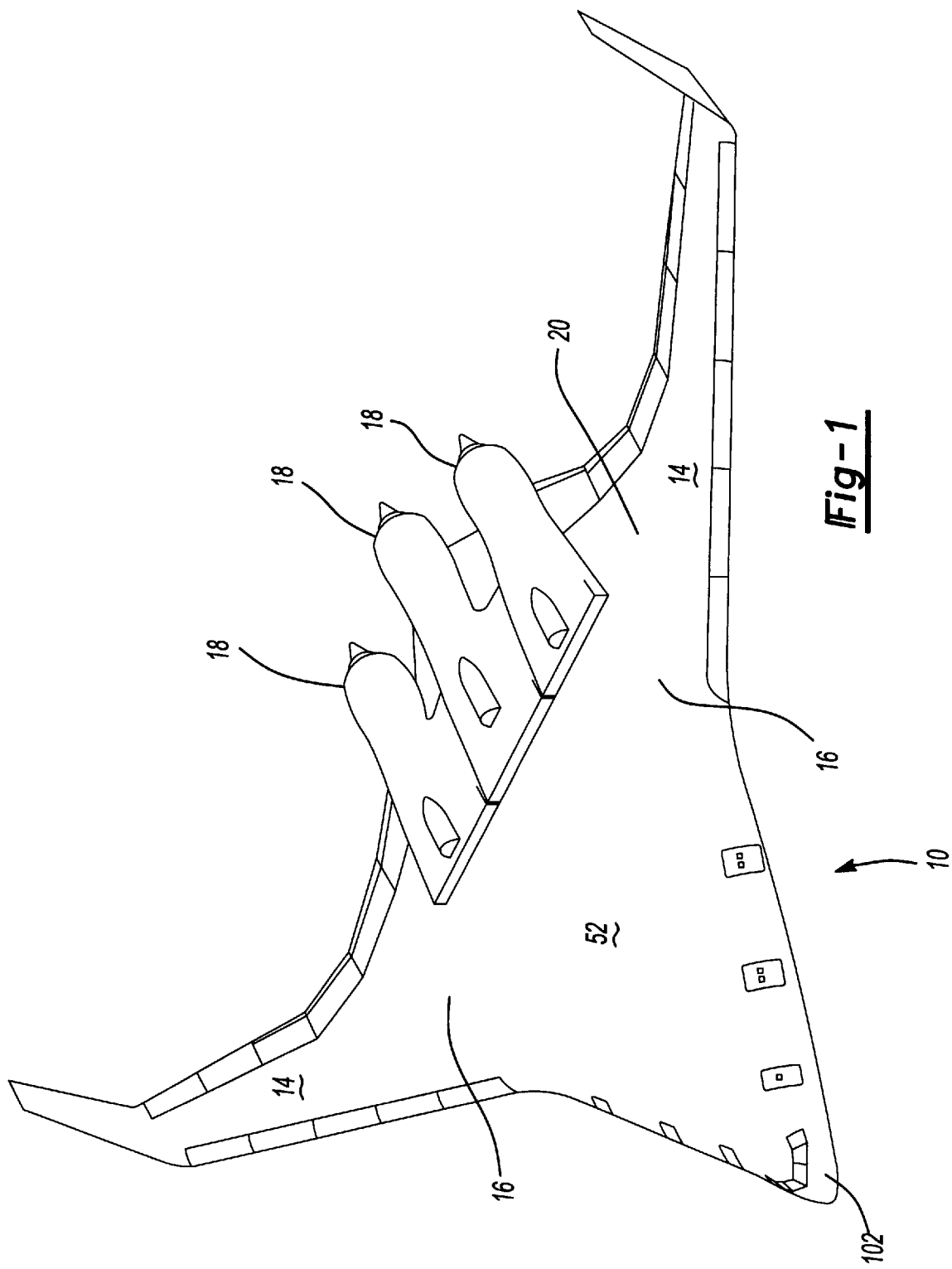
FIG. 1 is a perspective view illustrating a blended wing-body aircraft employing a dual boundary layer engine inlet system according to the principles of the present invention.

The following description of the preferred embodiment is merely exemplary in nature and is in no way intended to limit the invention, its application, or uses. For example, the dual boundary layer engine inlet system of the present invention may find utility in a variety of different aircraft applications, such as subsonic aircraft, supersonic aircraft, and conventional fuselage-wing aircraft. The following disclosure simply relates to the preferred embodiment as illustrated in the drawings, however, such description should not be interpreted as a limitation of the scope of the present application.

Referring to FIG. 1, a blended wing-body aircraft 10 is illustrated having a fuselage 12 and a pair of wings 14. Blended wing-body aircraft 10 of the preferred embodiment is characterized by the smooth shallow curve formed by the exterior structural panels between fuselage 12 and wings 14. Unlike conventional aircraft designs, blended wing-body aircraft 10 has no discrete interface between fuselage 12 and wings 14. The exterior skin of fuselage 12 and wings 14 join together to form a blended region 16. Fuselage 12, wings 14, and blended region 16 cooperate to define a substantially uninterrupted wing member capable of providing aerodynamic lift to blended wing-body aircraft 10 according to known aerodynamic principles.

Blended wing-body aircraft 10 further includes a plurality of turbofan propulsion engines 18. As illustrated in the figures, the presently preferred embodiment includes three turbofan propulsion engines 18 generally mounted to an aft region 20 of blended wing-body aircraft 10. It should be appreciated, however, that the principles of the present invention may be employed in aircraft having any number of engines.

Figure 2:
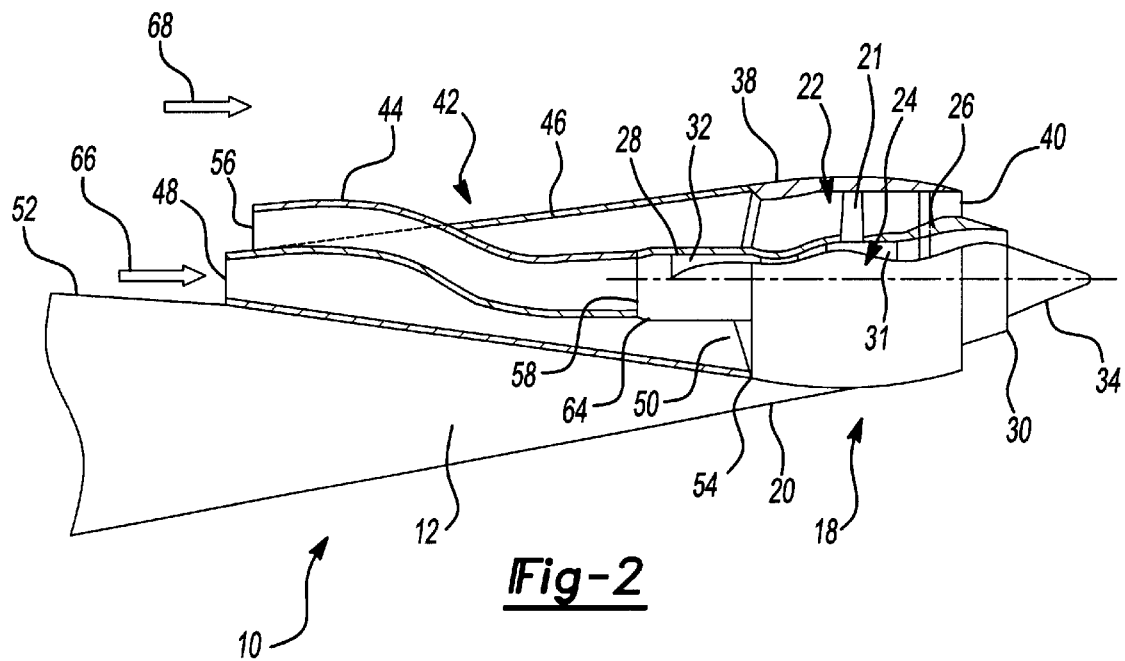
FIG. 2 is an enlarged side view, with portions in cross-section, illustrating the dual boundary layer engine inlet system.

As best seen in FIG. 2, turbofan propulsion engine 18 served by the presently preferred embodiment is a turbofan-type jet engine. For instance, an "aft fan" arrangement was featured on the GENERAL ELECTRIC CF 700-1. Specifically, turbofan propulsion engine 18 includes an aft-mounted bypass fan section 22 and a turbine section 24. Turbine section 24 is disposed concentrically within bypass fan section 22. Turbine section 24 generally includes a compressor casing 28 and an exhaust nozzle 30. A turbine rotor 31 is operably mounted within compressor casing 28 and is mechanically linked to a compressor 32. Compressor 32 is disposed within a compressor casing 28. Finally, a rear cone 34 is mounted within exhaust nozzle 30 so as to provide proper thrust flow from turbofan propulsion engine 18.

Bypass fan section 22 includes a plurality of fan blades 21 in a fan casing 38 so as to provide "cold" flow thrust from outlet 40 of bypass fan section 22.

In operation, feed air is supplied to turbofan propulsion engine 18 via a dual boundary layer engine inlet system 42. Engine inlet system 42 includes a compressor air inlet duct 44 and a bypass air duct 46.

Figure 3:
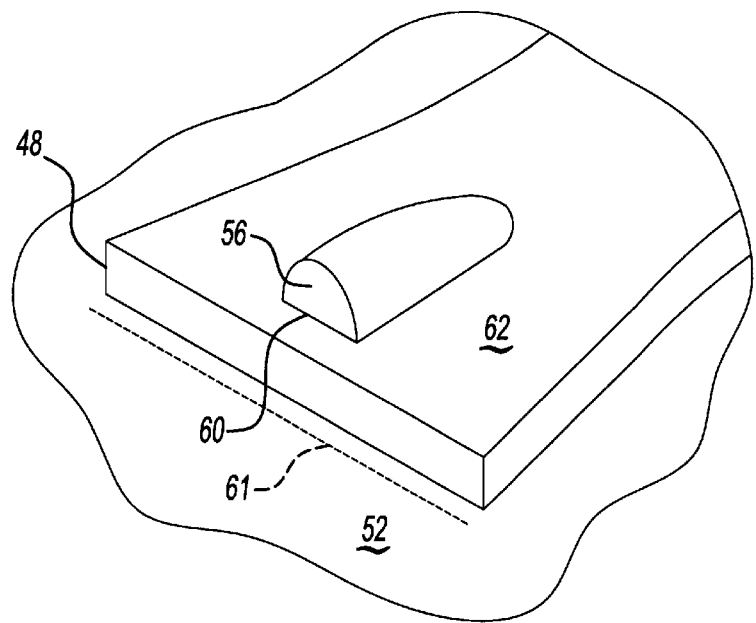
FIG. 3 is an enlarged perspective view of the inlets of the dual boundary layer engine inlet system.

Bypass air duct 46 includes an inlet end 48 and an outlet end 50. In the presently preferred embodiment of FIGS. 1 and 3, inlet end 48 of bypass air duct 46 is generally rectangular in shape such that it is positioned and substantially follows the curvature of an upper surface 52 of blended wing-body aircraft 10. It should be understood that upper surface 52 of blended wing-body aircraft and, consequently, inlet end 48 of bypass air duct 46 may include any inlet end profile that is conducive to the curvature shape of the aircraft or other aerodynamic requirements. Outlet end 50 of bypass air duct 46 is generally circular in cross-section so as to provide a proper fit with an inlet end 54 of bypass fan section 22 of turbofan propulsion engine 18. Therefore, bypass air duct 46 includes a generally complex three-dimensional transition from the generally rectangular inlet end 48 to the generally circular outlet end 50.

Compressor air inlet duct 44 of engine inlet system 42 is generally S-shaped having an inlet end 56 and an outlet end 58. Inlet end 56 of compressor air inlet duct 44 is generally semi-circular in shape (FIG. 3) and is positioned on top of or in a "piggy-back" position relative to bypass air duct 46. That is, a generally flat surface 60 of inlet end 56 of compressor air inlet duct 44 is positioned upon a corresponding top surface 62 of bypass air duct 46. Outlet end 58 of air inlet duct 44 is generally circular in shape and of sufficient size so as to be coupled to an inlet end 64 of compressor casing 28. A grid 61 serves as a trap for moisture and foreign objects, before the boundary layer air enters the compressor air inlet duct.

According to the principles of the present invention, air inlet duct 44 is positioned within a more high energy free-stream air. Accordingly, during flight, boundary layer air, generally indicated at 66 (FIG. 2), flows over upper surface 52 of blended wing-body aircraft 10. Inlet end 48 of bypass air duct 46 is generally disposed within this boundary layer air 66 so as to provide fluid communication of boundary layer air 66 to bypass fan section 22 of turbofan propulsion engine 18.

An advantage of this arrangement is that the operation of bypass fan 21 in bypass fan section 22 produces a reduced pressure at inlet end 54 of bypass fan section 22. This reduced pressure condition further exists within bypass air duct 46 and serves to scavenge the flow of boundary layer air 66 over upper surface 52 of blended wing-body aircraft 10. That is, the reduced pressure condition within bypass air duct 46 helps to enhance or promote the flow of boundary layer air 66 over a larger longitudinal portion of upper surface 52 relative to aircraft of conventional design not utilizing this reduced pressure condition.

In order to supply higher energy free-stream air to turbine section 24 of turbofan propulsion engine 18, inlet end 56 of turbine air duct 44 is positioned substantially above boundary layer air 66 (FIG. 2) and, thus, is open to free-stream air, generally indicated at 68. Such free-stream air 68 is supplied to inlet end 56 of compressor inlet 58. As is well known in the art, free-stream air serves to improve the engine efficiency of known jet propulsion engines.

As should be appreciated from the foregoing discussion, the dual boundary layer engine inlet system according to the principles of the present invention provides a number of aerodynamic and commercial advantages. For instance, the dual boundary layer engine inlet system of the present invention provides a method of supplying high energy free-stream air to the engine's compressor inlet while, simultaneously, supplying boundary layer air to a bypass fan inlet. The bypass fan produces reduced pressure that scavenges and promotes the attached relationship of the boundary layer air to the aircraft lift surfaces. Furthermore, the dual boundary layer engine inlet system of the present invention enables the aft mounting of the turbofan propulsion engines so as to facilitate simple and convenient repair and/or maintenance in a commercial environment. Simple and convenient repair and maintenance of the jet engines is a prerequisite to commercial viability within the passenger and military transport arenas.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An engine inlet assembly for a jet propulsion engine of a blended wing-body aircraft, said jet propulsion engine being mounted upon a substantially uninterrupted lifting member of said blended wing-body aircraft, said jet propulsion engine having a turbine section and a bypass fan section, said bypass fan section providing cold flow thrust to said jet propulsion engine, said engine inlet assembly comprising:

a first air inlet being positioned generally within a boundary layer flowing around said substantially uninterrupted lifting member of the aircraft, said first air inlet being operable to scavenge said boundary layer to maintain the flow of said boundary layer over said substantially uninterrupted lifting member to reduce drag;

a first passage fluidly connectable between said first air inlet and an inlet to the bypass fan section of the jet propulsion engine;

a second air inlet being positioned generally outside of said boundary layer; and a second passage fluidly connectable between said second air inlet and an inlet to the turbine section of the jet propulsion engine, said second passage being separate from said first passage.

2. The engine inlet assembly according to claim 1 wherein said second air inlet generally provides unobstructed air flow to the jet propulsion engine.

3. The engine inlet assembly according to claim 1 wherein said second passage is generally S-shaped.

4. The engine inlet assembly according to claim 1 wherein said first air inlet is generally rectangular, said first air inlet being positionable generally flush on said exterior surface of the aircraft; and said second air inlet is generally semi-circular, said second air inlet being generally positioned in piggyback relationship with said first air inlet.

5. The engine inlet assembly according to claim 1 wherein said first passage includes an outlet end being in fluid communication with said jet propulsion engine; and said second passage includes an outlet end being in fluid communication with said jet propulsion engine, said outlet end of said second passage being generally positioned in concentric relationship with said outlet end of said first passage.

6. The engine inlet assembly according to claim 1, further comprising:

a grid member mounted to said first air inlet to minimize entry of moisture and foreign objects into said first passage.

7. A blended wing-body aircraft having an exterior body surface, said aircraft comprising:

a substantially uninterrupted lifting member for producing lift;

a boundary layer flowing over said substantially uninterrupted lifting member;

a jet engine having a turbine section and a bypass fan section, said jet engine being mounted upon said substantially uninterrupted lifting member of said blended wing-body aircraft;

a first air inlet passage providing fluid communication between a portion of said boundary layer flowing over said substantially uninterrupted lifting member of the aircraft and said bypass fan section of said jet engine, said first air inlet being operable to scavenge said boundary layer to maintain the flow of said boundary layer over said substantially uninterrupted lifting member to reduce drag; and a second air inlet passage providing fluid communication between an air stream outside said boundary layer and said turbine section of said jet engine, said second air inlet passage being separate from said first air inlet passage.

8. A blended wing-body aircraft comprising:

a substantially uninterrupted lifting member for producing lift;

a boundary layer flowing over said substantially uninterrupted lifting member;

a turbofan type jet engine having a core and compressor and a fan, said turbofan jet engine being mounted upon said substantially uninterrupted lifting member of said blended wing-body aircraft;

a first air inlet passage being coupled in fluid communication between said portion of a boundary layer flowing over said substantially uninterrupted lifting member and said fan, said first air inlet passage being operable to scavenge said boundary layer to maintain the flow of said boundary layer over said substantially uninterrupted lifting member to reduce drag; and a second air inlet passage being coupled in fluid communication between an air stream outside said boundary layer and said core and compressor for providing free stream air flow to said core and compressor.

9. The aircraft according to claim 8 wherein:

said first air inlet passage includes an inlet end and an outlet end; and said second air inlet passage includes an inlet end and an outlet end, said inlet end of said second air inlet passage being generally positioned in piggyback relationship with said inlet end of said first air inlet passage, said outlet end of said second air inlet passage being generally positioned in concentric relationship with said outlet end of said first air inlet passage.

10. The aircraft according to claim 7 wherein:

said first air inlet passage having an inlet end being positionable generally flush on substantially uninterrupted lifting member of the aircraft; and said second air inlet passage having an inlet end being generally positioned in piggyback relationship with said inlet end of said first air inlet passage.

11. The aircraft according to claim 7 wherein said jet engine is aft-mounted.

12. The aircraft according to claim 7, further comprising:

a grid member mounted to said first air inlet passage to minimize entry of moisture and foreign objects therein.

13. An aircraft comprising:

a substantially uninterrupted wing member for producing lift;

a boundary layer flowing over said substantially uninterrupted wing member;

a turbofan type jet engine having a core and compressor and a fan, said turbofan type jet engine being mounted upon said substantially uninterrupted wing member;

a first air inlet passage providing fluid communication between a portion of said boundary layer flowing over said substantially uninterrupted wing member and said fan, said first air inlet passage being operable to scavenge said boundary layer to maintain the flow of said boundary layer over said substantially uninterrupted wing member to reduce drag; and a second air inlet passage providing fluid communication between an air stream outside said boundary layer and said turbine for providing free stream air flow to said core and compressor.

14. The aircraft according to claim 13 wherein:

said first air inlet passage includes an inlet end and an outlet end; and said second air inlet passage includes an inlet end and an outlet end, said inlet end of said second air inlet passage being generally positioned in piggyback relationship with said inlet end of said first air inlet passage, said outlet end of said second air inlet passage being generally positioned in concentric relationship with said outlet end of said first air inlet passage.

15. The aircraft according to claim 13 wherein:

said first air inlet passage having an inlet end being positionable generally flush on substantially uninterrupted wing member of the aircraft; and said second air inlet passage having an inlet end being generally positioned in piggyback relationship with said inlet end of said first air inlet passage.

16. The aircraft according to claim 13 wherein said jet engine is aft-mounted.

17. The aircraft according to claim 13, further comprising: a grid member mounted to said first air inlet passage to minimize entry of moisture and foreign objects therein.

* * * * *